United States Patent [19]
Lucole

[11] 3,872,478
[45] Mar. 18, 1975

[54] THREE DIMENSIONAL SEISMOGRAPH

[75] Inventor: Spencer W. Lucole, Evanston, Ill.

[73] Assignee: Nitro-Nobel A.B., Stockholm, Sweden

[22] Filed: June 14, 1974

[21] Appl. No.: 479,420

[52] U.S. Cl.............. 346/7, 73/71.4, 340/15.5 CP, 340/15.5 SW
[51] Int. Cl. ............................................. G01d 9/32
[58] Field of Search ...... 346/7, 33 C; 73/71.4, 71.2; 340/15.5 CP, 15.5 SW, 15.5 MC

[56] References Cited
UNITED STATES PATENTS

| | | | |
|---|---|---|---|
| 1,438,462 | 12/1922 | Palmgren | 346/7 |
| 2,578,803 | 12/1951 | Holmberg et al. | 346/7 |
| 3,344,881 | 10/1967 | White | 340/15.5 SW X |
| 3,603,140 | 9/1971 | Spencer | 73/71.4 |

Primary Examiner—Joseph W. Hartary
Attorney, Agent, or Firm—Wolfe, Hubbard, Leydig, Voit & Osann, Ltd.

[57] ABSTRACT

A three-dimensional seismograph recorder having three linear velocity transducers disposed with their axes at relative right angles and their outputs connected to a circuit for computing the square root of the sum of the squared transducer output signals, the so-computed resultant velocity signal being used to drive a single arm recorder. A record time base is established by a timing circuit that pulses a second stylus at regularly predetermined intervals. If desired, displacement information is recorded by integrating the resultant velocity signal and driving another stylus if a threshold value is exceeded.

3 Claims, 1 Drawing Figure

PATENTED MAR 18 1975          3,872,478
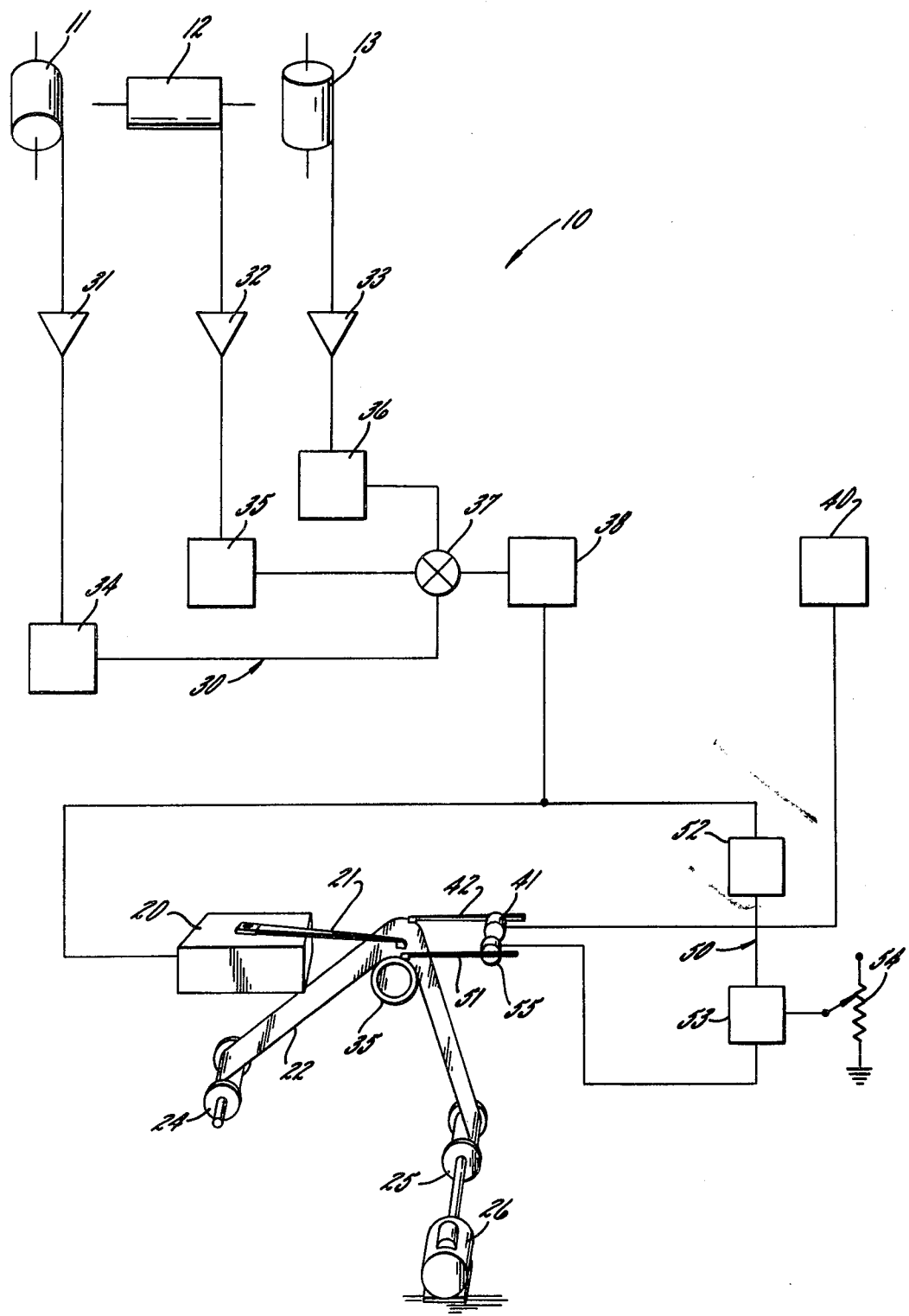

THREE DIMENSIONAL SEISMOGRAPH

This invention relates generally to seismographic equipment and more particularly concerns a monitoring seismograph.

Many industrial activities produce vibration energy which, in the form of vibration or velocity waves outside of the desired area of effect, is both annoying and potentially damaging or dangerous. Mining, quarrying and heavy construction often employ explosives, and construction and heavy industry commonly use equipment and machines with massive moving parts, all capable of generating a great deal of vibration or shock energy.

Such operations are becoming increasingly subject to environmental regulations restricting shock wave generation to certain limits. Moreover, it is usually advisable for the causing agency to have its own documentation of what, in fact, happened so that protests and damage claims can be properly evaluated. Monitoring adjacent structures likely to be affected by shock or vibration has commonly been done by using seismographic equipment positioned at test locations which is "read" at times coinciding with the time of events that are likely to produce an undesirable effect. Since such events are conventionally repetitive parts of an ongoing operation, rather than a single isolated occurrence, such monitoring requires a number of people, creates problems of time coordination, and is subject to the risk of missing the effect of a given event.

Also, such monitoring has been expensive, both because of the operating personnel requirements and because the basic seismographic equipment has been complicated and expensive.

Accordingly, it is the primary aim of the invention to provide a three-dimensional seismographic recorder capable of monitoring velocity waves, unattended, continuously over an extended period of time—on the order of 30 days.

It is also an object of the invention to provide a seismograph of the above character which is compact and lightweight, and hence suitable for convenient and inconspicuous installation at virtually any test location.

A further object is to provide a seismograph that is relatively inexpensive and yet capable of accurately and reliably sensing and recording shock or velocity waves traveling in any direction.

Other objects and advantages of the invention will become apparent upon reading the following detailed description and upon reference to the drawing, which is a schematic of a seismograph embodying the invention.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning to the drawing, there is schematically shown a seismograph 10 capable of continuously monitoring velocity wave events received from any direction, and recording the sensed velocity information over an extended period of time.

For sensing the velocity wave energy, three linear velocity transducers 11, 12 and 13 are fixed with their shock responsive axes disposed at relative right angles. The transducers 11-13 are of the movable magnet in a fixed coil type capable of developing an electrical signal proportional to the energy of a velocity wave component acting along the respective axes so as to displace the transducer magnets.

For recording the seismic information, a strip recorder is embodied in the seismograph 10 which includes an actuator 20 that moves a stylus 21 proportionally to electrical signals received by the actuator 20. The stylus 21 records on a paper strip 22 that is fed over a platen 35 from a supply roll 24 to a take-up roll 25 driven by a motor 26. To minimize power consumption and maintenance problems, the paper 22 is pressure sensitive and the scribing end of the stylus is simply a pointed element.

In accordance with the invention, an electric circuit 30 couples the transducers 11-13 to the recorder actuator 20 by mathematically squaring the signals from the transducers, algebraically summing the squared signals, taking the square root of the summed signals, and applying the resulting signal to the actuator. In more detail, the signals from the transducers 11-13 are scaled up by amplifiers 31, 32 and 33 and are directed to operational amplifier multipliers 34, 35 and 36 which mathematically square their input signals. The output signals from the multipliers 34-36 are summed at a summing network 37 and directed to a square rooter 38 which, in effect, operates oppositely to the multipliers 34-36 and develops an output signal which is proportional to the mathematical square root of the input signal received.

The output signal from the square rooter 38 is thus proportional to the resultant velocity of the three, right-angled velocity components detected by the transducers 11-13. The stylus 21 is therefore driven to record that resultant velocity on the paper strip 22.

For providing a time reference on the record strip 22, a timing circuit 40 drives a solenoid pulsing actuator 41 that moves a second stylus 42. Preferably, the timing circuit embodies a high frequency crystal controlled oscillator, a frequency divider and a time limiter, all scaled to produce one output pulse per hour and thus a mark on the paper strip 22 indicative of the passage of one hour. In the preferred instrument, the motor 26 drives the paper 22 at a 1 inch per hour rate, so that a compact 65 foot roll of paper 24 will permit continuous recording over a 30 day period.

As a feature of the invention, the seismograph 10 also records displacement information by employing a second circuit 50 which integrates the resultant velocity signal and, if the so-computed displacement is greater than a threshold value, actuates a third marking stylus 51. In the preferred embodiment, the circuit 50 includes an operational amplifier integrator 52 and a comparison amplifier threshold circuit 53 that includes a settable potentiometer 54 in a reference voltage circuit. When a signal proportional to displacement is received by the circuit 53 that exceeds that set by the potentiometer 54, a solenoid 55 is pulsed to drive the marking stylus 51. The resulting record strip 22 will thus show the time at which a shock produced displacement greater than a threshold value.

It is apparent that the seismograph 10 is capable of continuously monitoring shock or velocity energy over an extended period of time without the need for operator attention. Only a small single arm recorder is necessary since the three-axis transducers have their outputs computed to produce a resultant velocity signal. By using small transducers together with the single arm recorder, a compact lightweight instrument package can be achieved, it being understood, as those skilled in the art will appreciate, that modern electronic technology permits the assembly of circuits as those described above from small subcircuit components.

I claim as my invention:

1. A seismograph comprising, in combination, three linear velocity transducers having shock responsive axes disposed at relative right angles, each of said transducers being capable of developing an electrical signal proportional to the energy of a velocity wave component acting along the respective axis of the transducer, a strip recorder having a stylus driven by an actuator which moves the stylus proportionally to an electrical signal received by said actuator, and an electric circuit coupling said transducers and said recorder actuator, said circuit including means for squaring the signals from the transducers, algebraically summing the squared signals, taking the square root of the summed signals to produce a resultant velocity signal, and applying said resultant velocity signal to the recorder actuator.

2. The combination of claim 1 including a second stylus driven by a pulsing actuator, and a timing circuit for pulsing said pulsing actuator at regular predetermined intervals.

3. The combination of claim 1 including a second stylus driven by a pulsing actuator, and a second circuit coupling said resultant velocity signal to said pulsing actuator, said second circuit including a time integrator for pulsing said pulsing actuator when the integrated resultant velocity signal exceeds a threshold limit, thus recording sensed displacement greater than said threshold limit.

* * * * *